US009101950B2

(12) United States Patent
Espy

(10) Patent No.: US 9,101,950 B2
(45) Date of Patent: Aug. 11, 2015

(54) SPRAYER SWIVEL BODY FOR PACKING HOUSE WASHER

(75) Inventor: Tom Espy, Marshfield, MO (US)

(73) Assignee: BIRKO CORPORATION, Henderson, CO (US)

( * ) Notice: Subject to any disclaimer, the term of this patent is extended or adjusted under 35 U.S.C. 154(b) by 666 days.

(21) Appl. No.: 12/939,270

(22) Filed: Nov. 4, 2010

(65) Prior Publication Data

US 2011/0101133 A1 May 5, 2011

Related U.S. Application Data

(60) Provisional application No. 61/257,923, filed on Nov. 4, 2009.

(51) Int. Cl.
*F16L 27/04* (2006.01)
*B05B 15/06* (2006.01)

(52) U.S. Cl.
CPC .................................... *B05B 15/067* (2013.01)

(58) Field of Classification Search
CPC ......... F16L 27/04; F16L 27/047; F16L 27/06; F16L 27/073; B05B 15/067
USPC ........... 285/146.1, 261, 270, 272, 266, 146.2, 285/146.3
See application file for complete search history.

(56) References Cited

U.S. PATENT DOCUMENTS 149,842 A * 4/1874 Deeds ............................ 138/113
382,514 A * 5/1888 Davis ............................ 285/266
409,277 A * 8/1889 Curley .......................... 285/270
685,876 A * 11/1901 Shields ...................... 285/146.2
713,347 A * 11/1902 Reilly ........................ 285/146.1
757,143 A * 4/1904 Reilly ........................ 285/146.1
908,414 A * 12/1908 Mellin .......................... 285/270
1,568,649 A * 1/1926 Woodruff ...................... 285/266
1,604,868 A * 10/1926 Woodruff ...................... 285/267
1,733,457 A * 10/1929 Hannahs ....................... 285/271
1,860,888 A * 5/1932 Crowley ....................... 285/261
1,925,335 A * 9/1933 Murphy ..................... 285/146.1
1,929,635 A * 10/1933 Goff .............................. 285/266
2,111,200 A * 3/1938 Amourelle ................. 285/146.2
2,175,752 A * 10/1939 Gray .......................... 285/146.2
2,631,048 A * 3/1953 Palmer .......................... 285/266
3,276,795 A * 10/1966 Heygate ........................ 285/270
4,404,103 A * 9/1983 Drath ............................ 285/277
4,671,543 A * 6/1987 Miliczky ....................... 285/270
4,811,431 A * 3/1989 Kraverath ...................... 285/266
4,842,059 A * 6/1989 Tomek ....................... 285/146.1
4,854,614 A * 8/1989 Torichigai et al. .............. 285/93
5,288,110 A * 2/1994 Allread ...................... 285/146.1
6,454,313 B1 * 9/2002 Dawson et al. ............... 285/261
6,497,220 B1 * 12/2002 Boecking ...................... 285/261
8,196,967 B2 * 6/2012 Seifert et al. .................. 285/261

* cited by examiner

*Primary Examiner* — David E Bochna
(74) *Attorney, Agent, or Firm* — TraskBritt, P.C.

(57) ABSTRACT

A swivel body for a packing house washer which includes a hollow housing, a ball joint mounted on a water line coupler which is mounted into the hollow swivel body. The waterline coupler has a hollow neck which is in fluid communication with the swivel body chamber. Water is forced into the swivel body chamber and passes through the waterline coupler into a spray bar. The ball joint fastened to the coupler and neck allows the waterline coupler to articulate within the swivel body. Bushings are used for water tight fitting of the ball joint within the housing.

9 Claims, 6 Drawing Sheets

SPRAYER SWIVEL BODY FOR PACKING HOUSE WASHER

RELATED APPLICATION

This application claims the priority of Ser. No. 61/257,923 filed Nov. 4, 2009 the disclosure of which is incorporated herein by reference.

BACKGROUND

1. Field

This disclosure relates generally to the field of washing devices for use in packing houses, and more particularly to a unique sprayer swivel body for a packing house carcass washer.

2. Description of Related Art

Meat packing houses or slaughter houses utilize a variety of machinery to clean animal carcasses. Washing machines that spray pressurized jets of water onto animal carcasses are generally known within the industry. Particular to packing houses for large animals, such as beef or pork facilities, washing devices have long been used which include a number of spaced apart spray bars, each bar having a plurality of openings through which pressurized water is sprayed directly onto an animal carcass to remove debris, blood and the like.

These systems may include two (2) or more spray assemblies spaced apart to form an alleyway. Carcasses, often hanging from shackles, are transported along the alleyway between the rows of spray bars so that all sides of the carcass are washed.

It is also common for the spray bars to be mounted on racks to form a sprayer wall assembly. Multiple spray bars are spaced apart and aligned such that the spray nozzles on each spray bar are generally oriented in the same direction, aimed generally inward the alley way. It should be understood that the orientation of the spray bars and spray wall assemblies can vary. Regardless of the spray wall orientation or composition, animal carcasses are transported between the spaced apart sprayer walls such that all sides of the carcass are sprayed.

Known spray devices include a water source that is connected to a water valve, sometimes called a swivel body in the industry. The water valve or swivel body directs the water source through an impeller shaft into a water spray line. Pressurized water is then forced through spray nozzles or jets formed into each water line for application directly onto the animal carcass. In known devices, the connection between the water valve and the water spray line is rigid. A number of replaceable bushings are utilized within the water valve to limit or control water leakage between the valve and the impeller shaft and between the valve and the water spray line. At least one set screw is secured through the water valve body to maintain each bushing in place.

Currently, as large animal carcasses travel along the line and move between the water washing walls, they are subjected to the forcible water spray that causes the carcasses to pivot, swivel and swing side to side. It is common for the animal carcasses to forcibly contact the water spray lines, the water valves and other parts of the assembly.

Because the impeller shaft is rigidly fixed within the water valve, as animal carcasses repeatedly strike the mechanism, it causes substantial wear of the bushings. Moreover, the impeller shaft itself may become bent over time which results in pressure loss or water leaking. Because the water spray lines are rigidly fixed to the water valve they are also often bent by contact from the animal carcasses and they quickly become damaged or inoperable. This necessitates substantial repair and maintenance of the known systems.

Each spray bar is mounted on a rack and is generally connected to a water source at each end. A water valve is used to connect the water source to the water spray bar at each opposing end. Thus, each water bar includes two (2) water valves assemblies. A typical production line usually includes about 20 sprayer bars having 40 total water valves. Because of the extreme wear and tear on the devices, it is necessary to repair or replace these water valves every few months. What is needed is a water valve assembly for use in a packing house that is not easily damaged by the carcasses contacting the spray bars as the carcasses travel along the process line. The instant invention achieves this stated goal by replacing the traditional washer water valve with a very durable manufactured swivel body which includes a ball joint attachment between the swivel body and the spray bar. The swivel body allows the spray bar to move when contacted by animal carcasses thereby limiting damage. Further, the inventive swivel body eliminates the use of set screws, impeller shafts and set collars and is, accordingly, much easier to repair and maintain.

SUMMARY

The instant invention is a unique and novel swivel body for a packing house washer. The swivel body is intended to replace the traditional water valves used for packing house water spray devices. The swivel body is manufactured from durable materials such as stainless steel. An inlet into the swivel body is provided through which pressurized water is forced. At one end of the swivel body a pivot ball or ball joint assembly is attached to a waterline coupler. A pair of bushings are mounted adjacent the ball joint to eliminate water leaking as the ball joint articulates within the chamber of the swivel body. A bore through the waterline coupler allows fluid communication with the swivel body chamber. Accordingly, water forced into the swivel body chamber through the inlet then passes into the bore of the waterline coupler and then into a sprayer bar attached thereto. As animal carcasses contact the spray bar the ball joint is articulated, within limits defined by the dimensions of the swivel body chamber, and this movement significantly diminishes the likelihood of damage to the spray bar or the swivel body.

BRIEF DESCRIPTIONS OF THE DRAWINGS

DETAILED DESCRIPTION

Figure 1:
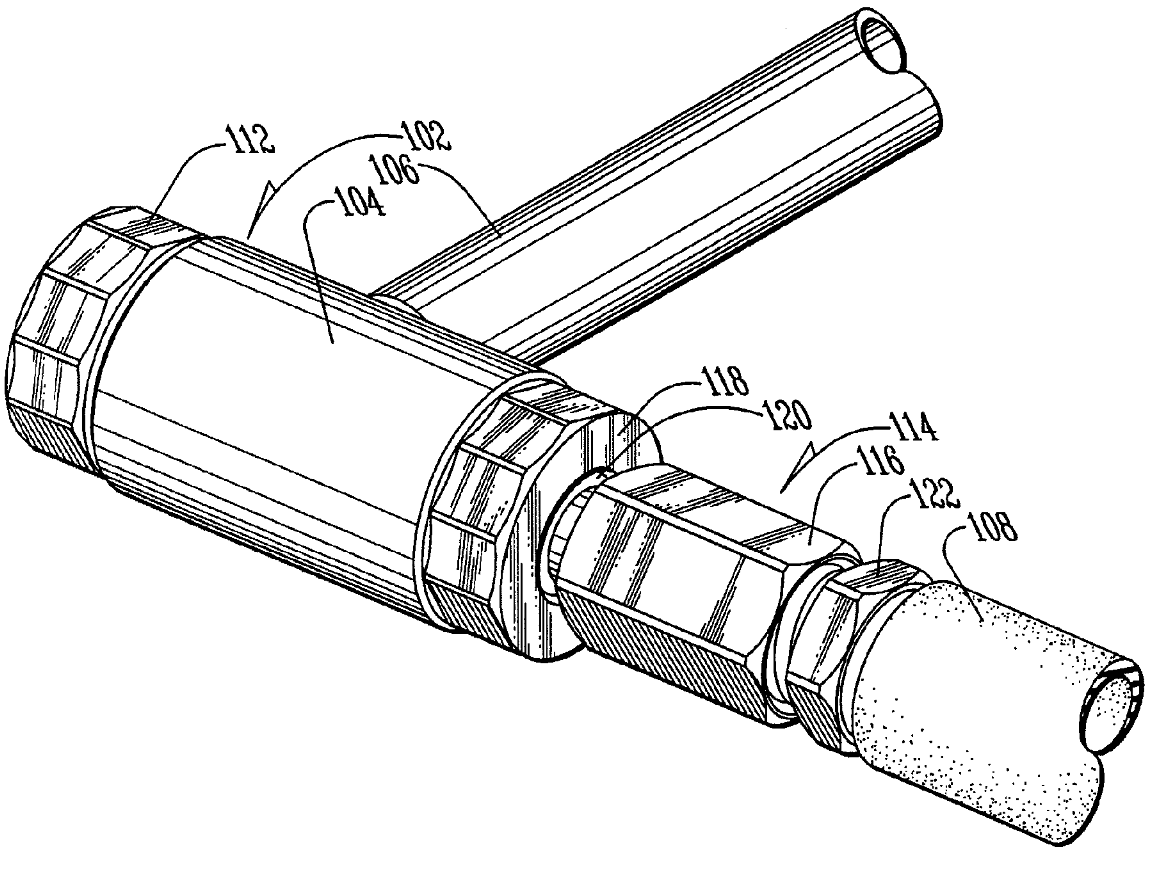
FIG. 1 is a perspective view of a spray bar assembly for use in a packing house.
Figure 2:
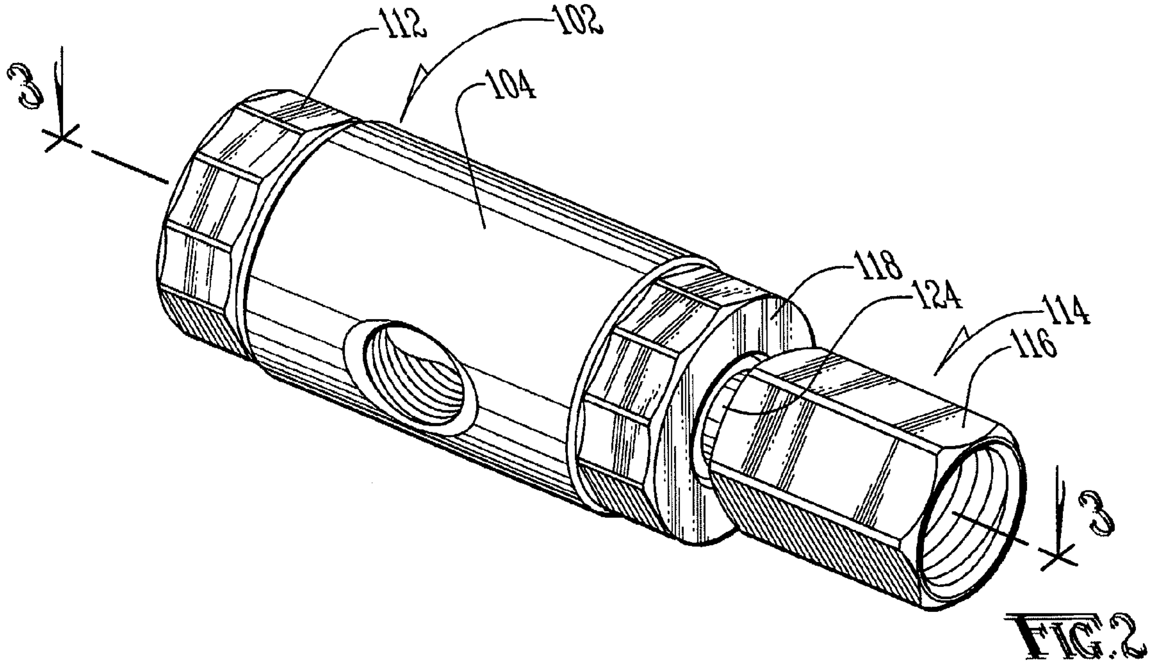
FIG. 2 is a perspective view of the swivel body showing the water line connections.

Referring now generally to the drawings, the inventive swivel spray body assembly for use in a packing house spray line is shown and generally referenced by 102. As shown best in FIG. 1, each swivel spray body assembled on a spray wall includes at least one (1) water valve attached at one end of the spray bar. In some applications, a separate water valve is provided at each end of the spray bar. Water is passed from the source into the water valve and is forced through the swivel body or water valve into the spray bar. A plurality of jets or water openings (not shown) are provided along each spray bar and water is forced out of these onto an animal carcass as it passes along a processing line. Nozzles may be used at each water opening on the spray bar to allow the user to customize water flow, water pressure and water direction.

The instant invention is generally limited to the manufacture and assembly of the water valve attached to the spray bar. For purposes of this invention, the term water valve is used interchangeably with the term swivel body. It is well known within the industry that multiple water valves will be used to form a spray rack or spray wall. The detailed description herein, however, is limited to a disclosure of a single water valve with the understanding that each water valve provided in a spray assembly is identical to the exemplar water valve described and disclosed herein. This is in no way intended to limit the scope of the disclosure or the claims appended hereto.

The spray bar is preferably constructed of durable but flexible material such as high density rubber. It is understood that the spray bar can also be manufactured of rigid tube or pipe and from a variety of materials such as galvanized steel, stainless steel or iron and the use of the novel swivel body will achieve substantial and similar improvements over the known devices. The preferred flexible spray bar has several significant advantages. First, the material cost of flexible hose is substantially less than metal piping. Further, the flexibility of the hose material further decreases damage to the spray valve when forcibly contacted by an animal carcass. The flexible hose also is easier to install, repair and replace. In particular, in conjunction with the moveability of the swivel connector of the innovative spray valve, the flexible material is extremely easy to connect.

Figure 5:
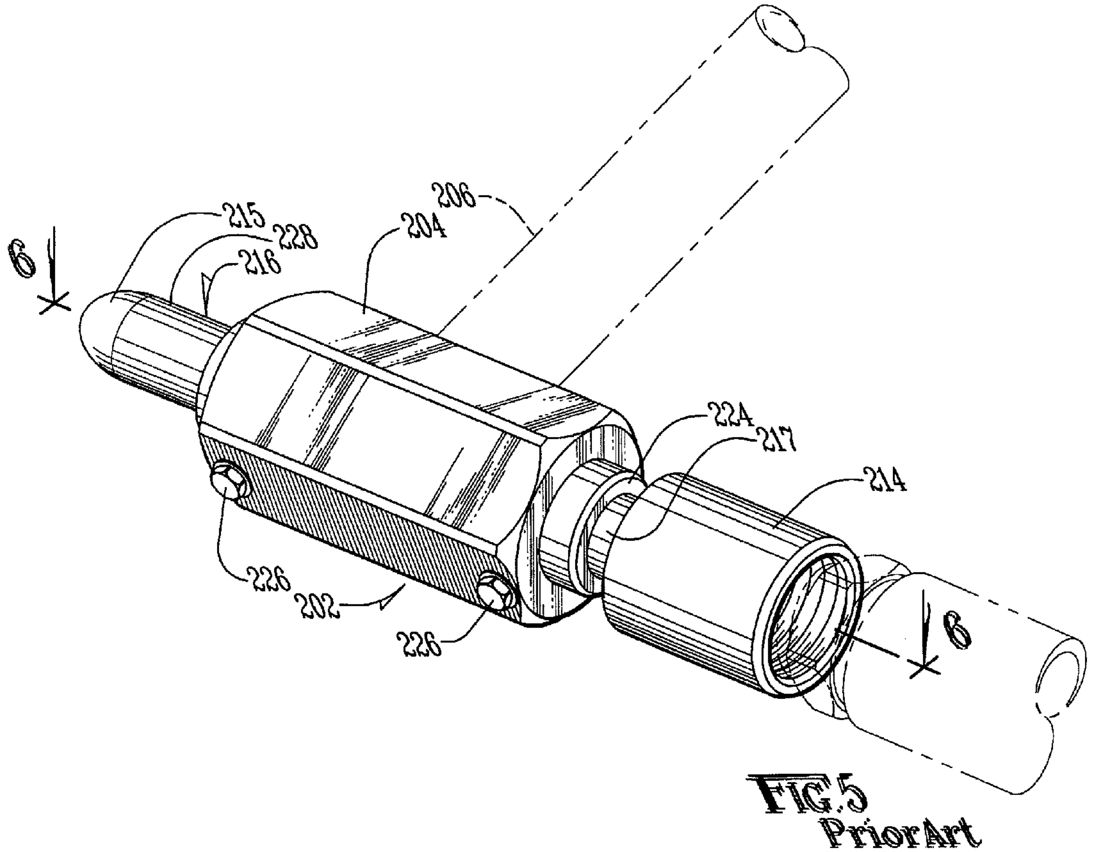
FIG. 5 Prior Art
FIG. 5 is a perspective view of a prior art spray body.
Figure 6:
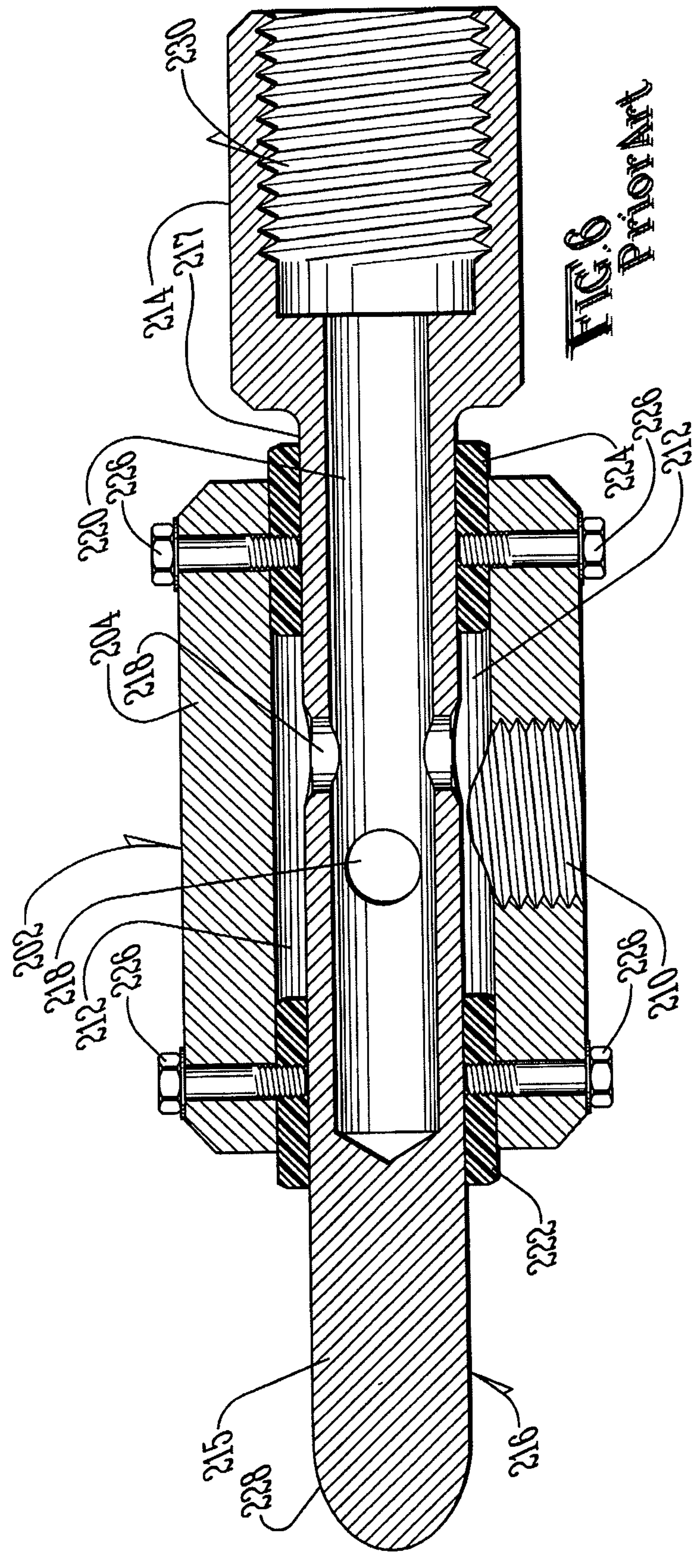
FIG. 6 Prior Art
FIG. 6 is a cross section view of the prior art spray body taken along line 6-6 of FIG. 5.

It is helpful to fully understand the prior art device to appreciate the advantages and improvements of the instant invention. Referring now to FIGS. 5 and 6, a prior art device is shown. The water valves which have long been used in packing houses include a water valve body 202 having a housing 204 with a chamber 212 formed axially through its length. A water inlet 210 is formed through the water valve housing 204 and is generally threaded for attachment to a water line 206. Thus, the chamber 212 of the water valve housing 204 is in fluid communication with an attached water line 206.

The water valve 202 is generally cylindrical in shape and may be formed from aluminum, hardened steel, stainless steel or other suitable materials. An impeller shaft 216 is mounted longitudinally through the water valve chamber 212. The water impeller shaft 216 also has a bore 220 and at least one opening 218 is provided in the impeller shaft 216 so that water can pass from the water valve chamber 212 into the bore 220 of the impeller shaft 216.

The impeller shaft 216 is longer than the water valve housing 204 and extends beyond the periphery of the water valve 204. At the first end 215 of the impeller shaft 216 a set collar 228 is provided for mounting the device onto a rack or other assembly (not shown). At the second end 217 of the impeller shaft 216 a water line coupler 214 is integrally formed. The water line coupler 214 includes a threaded socket 230 fixed at the second end 217 of the impeller shaft 216 and open at the opposite end for fastening to a spray bar 208.

Because the water valve 202 carries pressurized water, it is necessary to seal the impeller shaft 216 within the water valve chamber 212 to prevent water leaks. Accordingly, a forward bushing 224 is provided on the impeller shaft 216 substantially adjacent the water line coupler 214. A second or rear bushing 222 is provided on the impeller shaft 216 substantially adjacent to the set collar 228. Both the forward bushing 224 and rear bushing 222 are held in place by at least two set screws 226. The bushings are formed from nylon or other suitable material.

During use, when the prior art water valve became damaged, it was necessary to unfasten the set screws 226 to release the bushings 222, 224. Repair generally requires replacement of the impeller shaft 216 and integral water line coupler 214. New bushings are generally installed as a maintenance item. The old bushings may be somewhat difficult to remove and it is particularly difficult to align the bushings such that they can be fastened in place with the set screws. In cases of extreme damage, the water line might have to be cut and then replaced.

Now referring to FIGS. 1 through 4, the swivel body 102 of the instant invention is illustrated. Again, it will be appreciated that the swivel body 102 described herein is a single unit for attachment to one end of a single spray bar 108 and several of these devices are generally provided in a spray assembly. Each swivel body 102 described is identical in configuration to the others which are generally shown in FIGS. 1 through 4 but not specifically described herein.

Figure 3:
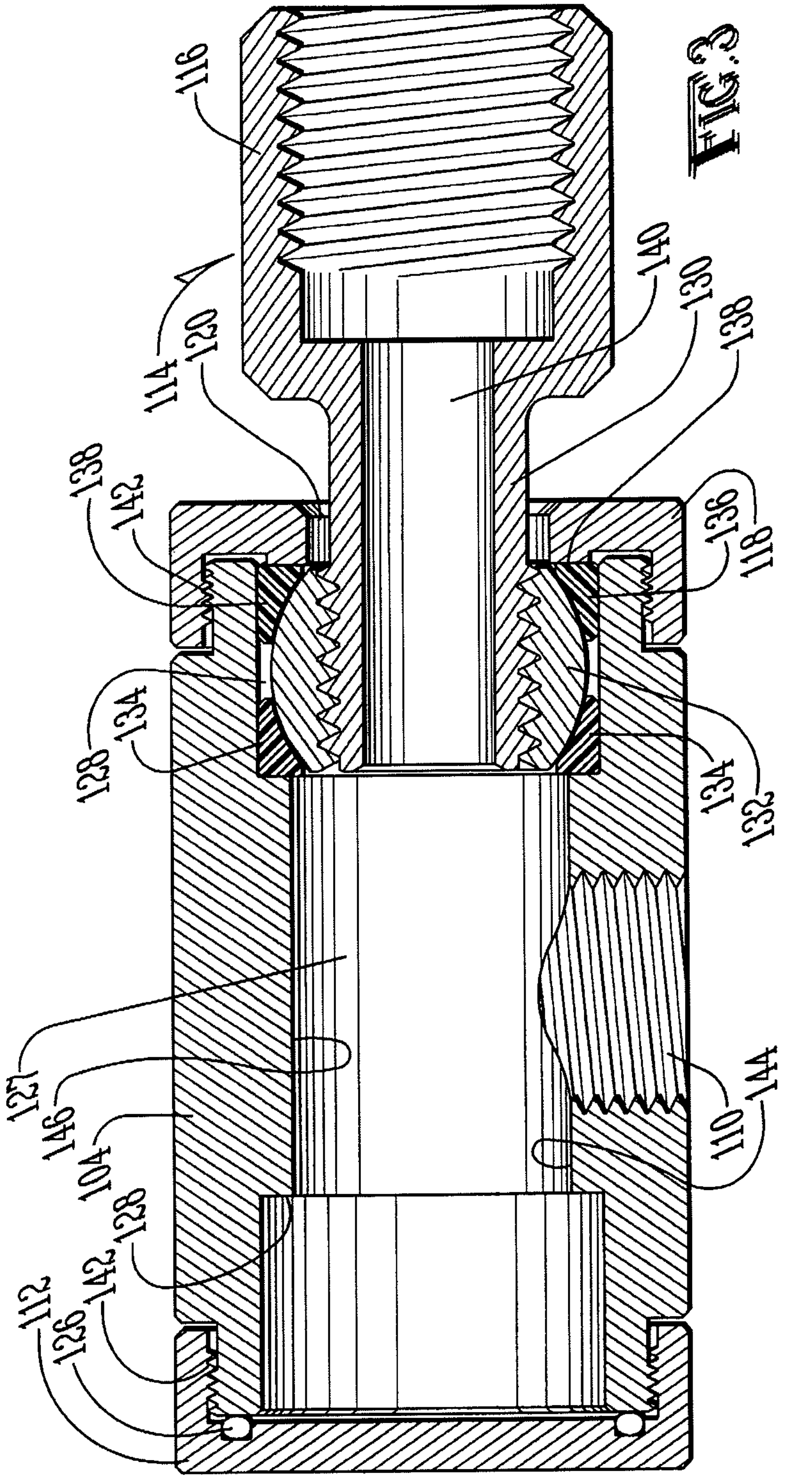
FIG. 3 is a cross section view taken along line 3-3 of FIG. 2.
Figure 4:
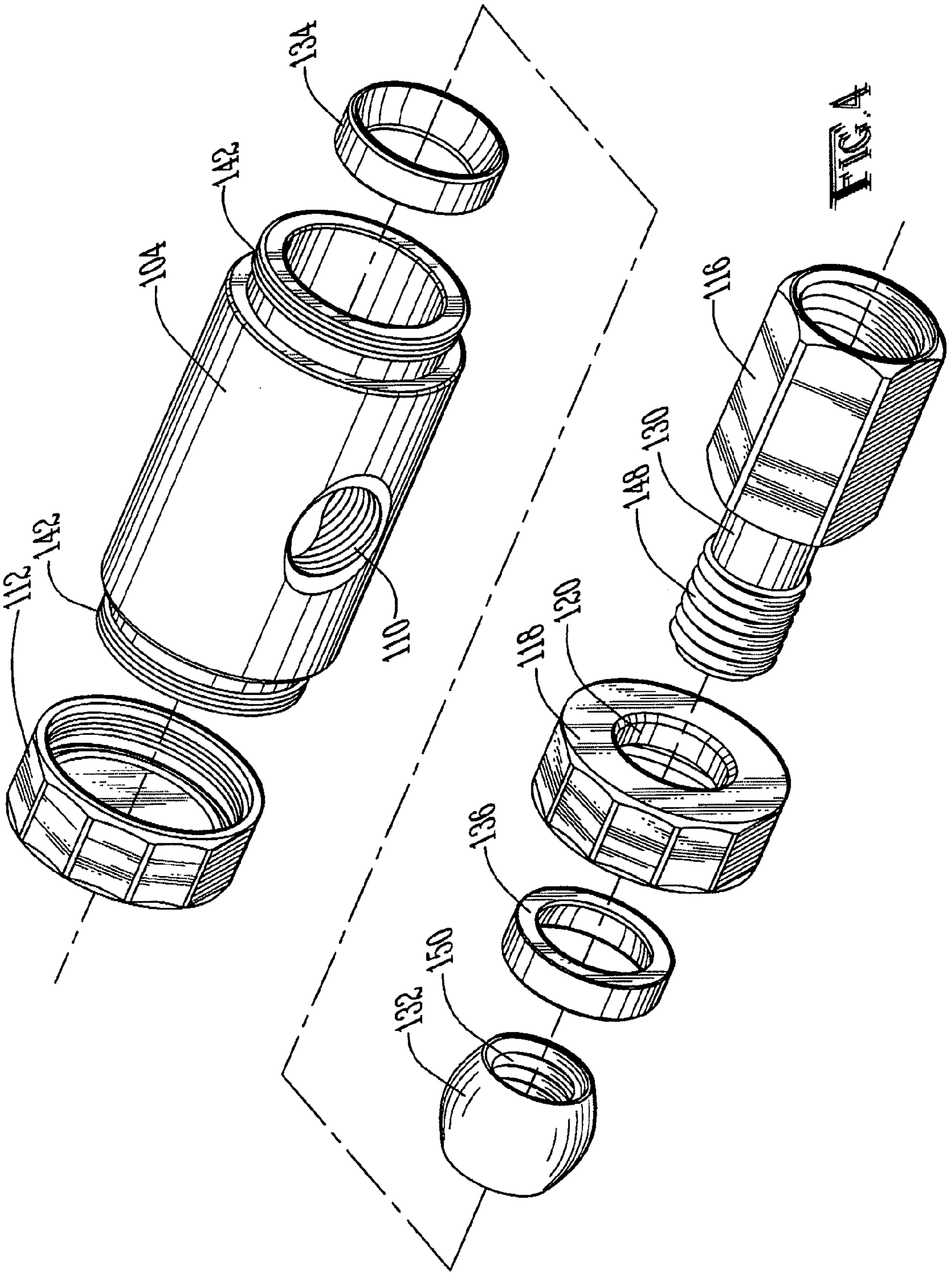
FIG. 4 is an exploded view of the inventive device.

As best shown in FIGS. 3 and 4, the inventive assembly includes a swivel body housing 104. The swivel body housing 104 is generally cylindrical in shape and is formed of aluminum, hardened steel, stainless steel or other suitable materials. The swivel body housing 104 defines a longitudinal chamber 127 therethrough. A water inlet bore 110 is provided substantially perpendicular to the chamber 127 of the swivel body housing 104. Pressurized water from a source is forced through the water inlet bore 110. The water inlet bore 110 is preferably provided with internal threads for attachment to an externally threaded water source line 106. The swivel body housing 104 is open at both ends of the chamber 127. It is preferred that external threads 142 are provided at each end of the swivel body housing 104. At a first end of the swivel body housing 104, an internally threaded cap 112 is fastened. The cap 112 may be provided with an internal seal 126 such as an O-ring to make the cap 112 to swivel body housing 104 connection water tight.

The chamber 127 of the swivel body housing 104 is formed such that it has an integral internal sleeve 144. The internal sleeve 144 is integral to the inner wall 146 of the inner body housing 104 and is formed by boring larger diameter water line coupler seats 128 in the chamber 127 at each end of the housing 104. Accordingly, the inner chamber 127 of the swivel body housing 104 has two (2) diameters as best shown in FIG. 3. The inner sleeve 144 forms a seat 128 at the juncture of the sleeve 144 and the inner wall 146 of the swivel body housing 104. A bushing 134 is frictionally retained at the junction of the sleeve 144 and the inner wall 146 of the swivel body housing 104. It will also be appreciated that the larger diameter portion of the chamber 127 is provided at both ends of the housing 104. This allows the water line coupler 114 to be installed at either end of the housing 104. Because the water inlet 110 is in a fixed position through the housing 104 if the water line coupler 114 could only be installed at one end of the housing 104 the orientation of the housing 104 at installation to the water line 106 would dictate the which end the water line coupler 114 would be mounted and two different housings would be required so that the water line coupler could be oriented to either the right or left side of the housing 104. Because the housing 104 includes a water line coupler seat 128 at both ends, the coupler 114 can be installed in either a left or right direction after the housing 104 is connected to the water supply line 106.

As best shown in FIGS. 3 and 4, a ball joint 132 is mounted to a coupler neck 130 which is formed on the water line coupler 114. The water line coupler 114 includes an internally threaded connector 116 for attachment to the water line spray bar 108. The neck 130 is formed opposite the threaded connector opening 116. Further, the neck 130 of the water line coupler 116 is hollow. The ball joint 132 is sized to slide over the outer periphery of the neck 130. The tolerances are such that the ball joint 132 can be frictionally retained on the neck 130, although, as shown, the neck can be provided with external threads 148 to mate to internal threads 150 formed in the ball joint 132.

An internally threaded cap 118 is also mounted on the neck 130 between the water line connector 116 and the ball joint 132. This cap 118 necessarily has an opening 120 through which the neck 130 is positioned. It is preferred that a small race 138 is formed on the inner surface of the cap 118 around the opening 120. A ball joint bushing 136 is placed between the internally threaded cap 118 and the ball joint 132. The race 138 of the threaded cap generally urges the ball joint bushing 136 onto the ball joint 132 as the cap 118 is fastened to the threads 142 of the swivel body housing 104. The opening 120 through the cap 118 is larger in diameter than the neck 130 of the coupler 114. This allows the ball joint 132 of the coupler 114 to articulate within the coupler seat 128 of the housing 104. As the cap 118 is secured onto the threads 142 of the housing 104, the ball joint 132 is captured by the bushings 134, 136 and a water tight seal is formed around the ball joint 132. This eliminates any leakage of water around the coupler 114 to housing 104 connection.

The bore 140 through the water line coupler neck 130 is in fluid communication with the internal chamber 127 of the swivel body housing 104. Thusly, as water is forced through the inlet 110 of the swivel body 102 it is then forcibly passed through the chamber 127 and through the bore 140 of the neck 130 and subsequently into an attached spray bar 108. The ball joint 132 allows the water line coupler 114 to articulate within the swivel body housing 104 to diminish damage to the line 106 and the swivel body 102 when forcibly contacted by animal carcasses.

While the present invention has been described above, it should be clear that many changes and modifications may be made to the device without departing from the spirit and scope of this invention.

What is claimed is:

1. A sprayer swivel body for a packing house washer, comprising:
- a swivel body housing defining a chamber therethrough, the chamber comprising a first end and a second end opposite the first end;
- a threaded end cap mounted on the first end of the chamber;
- a water line inlet positioned substantially perpendicular to the chamber and in fluid communication with the chamber;
- a water line coupler mounted on the second end of the chamber and in fluid communication with the chamber, the water line coupler comprising:
  - a water line connector comprising internally threads for fastening to a sprayer bar, and an integral hollow coupler neck,
  - a removable ball joint fastened onto the integral hollow coupler neck, and
  - a swivel body cap moveably positioned between the removable ball joint and the water line connector, wherein the removable ball joint is positioned within the chamber of the swivel body and captured therein by fastening the swivel body cap to the swivel body housing.

2. The swivel body of claim 1 further comprising at least one bushing between the swivel body cap and the removable ball joint.

3. The swivel body of claim 1 further comprising:
- a seat formed within the chamber of the swivel body housing adjacent the second end of the chamber; and
- a second bushing positioned between the seat and the removable ball joint to clamp and retain the removable ball joint upon fastening the swivel body cap.

4. The swivel body of claim 3 further comprising a second seat formed within the chamber, the second seat adjacent the first end of the chamber.

5. A sprayer swivel body for a packing house washer, comprising:
- a swivel body housing defining a longitudinal chamber therethough, the chamber comprising an integral internal sleeve and water line coupler seats at each end of the integral internal sleeve, wherein each of the water line coupler seats has a larger diameter than the integral internal sleeve;
- a water line inlet positioned substantially perpendicular to the longitudinal chamber; and
- a water line coupler mounted at one end of the longitudinal chamber and in fluid communication with the chamber, the water line coupler comprising:
  - a connector for connecting a sprayer bar, the connector comprising an integrally formed hollow coupler neck,
  - a removable ball joint mounted onto the coupler neck,
  - a water line connector cap moveably positioned on the coupler neck between the removable ball joint and the connector,
  - a first bushing inserted between the removable ball joint and the water line connector cap, wherein the removable ball joint is positioned within the chamber of the swivel body and captured therein by fastening the water line connector cap to the swivel body housing.

6. The swivel body of claim 5 further comprising a second bushing mounted between a seat formed within the chamber and the removable ball joint on the coupler neck.

7. The swivel body of claim 5 further comprising a race formed on an inner surface of the water line connector cap, wherein the race urges the first bushing onto the removable ball joint when the water line connector cap is fastened to the swivel body housing.

8. A sprayer swivel body for a packing house washer, comprising:
- a swivel body housing defining a chamber having a first diameter and a second diameter, wherein the first diameter defines an inner chamber sleeve, and wherein the juncture between the second diameter and the inner chamber sleeve forms a water line coupler seat;
- a water line inlet positioned substantially perpendicular to the chamber and in fluid communication with the chamber;
- a water line coupler aligned with the chamber near the water line coupler seat and in fluid communication with the chamber, the water line coupler comprising:
  - a connector for connecting a sprayer bar,
  - an integrally formed hollow coupler neck,
  - a removable ball joint mounted onto the coupler neck,
  - a water line connector cap moveably positioned on the coupler neck between the removable ball joint and the connector, a first bushing inserted between the removable ball joint and the water line connector cap, and a second bushing mounted at the water line coupler seat, wherein the entire removable ball joint is positioned within the chamber of the swivel body adjacent the water line coupler seat and captured therein by fastening the water line connector adjacent the water line coupler seat and captured therein by fastening the water line connector cap to the swivel body housing.

9. The swivel body of claim 8 further having a second seat formed within the chamber distal the first seat such that the water line coupler can selectively be mounted at either end of the swivel body.

* * * * *